US012564172B2

(12) United States Patent　　　(10) Patent No.:　US 12,564,172 B2
Piplani et al.　　　　　　　　　　(45) Date of Patent:　　　Mar. 3, 2026

(54) MILKING DEVICE FOR MILKING A DAIRY ANIMAL

(71) Applicant: LELY PATENT N.V., Maassluis (NL)

(72) Inventors: Akhil Piplani, Maassluis (NL);
Maarten Vincent Kea, Maassluis (NL)

(73) Assignee: LELY PATENT N.V., Maassluis (NL)

( * ) Notice: Subject to any disclaimer, the term of this
patent is extended or adjusted under 35
U.S.C. 154(b) by 43 days.

(21) Appl. No.: 17/911,804

(22) PCT Filed: Mar. 22, 2021

(86) PCT No.: PCT/NL2021/050189
§ 371 (c)(1),
(2) Date: Sep. 15, 2022

(87) PCT Pub. No.: WO2021/201672
PCT Pub. Date: Oct. 7, 2021

(65) Prior Publication Data
US 2023/0127071 A1　　Apr. 27, 2023

(30) Foreign Application Priority Data

Apr. 2, 2020　(NL) ................................. NL2025264

(51) Int. Cl.
*A01J 5/017*　　　(2006.01)
*A01J 7/02*　　　(2006.01)
*A01J 7/04*　　　(2006.01)

(52) U.S. Cl.
CPC ............... *A01J 5/0175* (2013.01); *A01J 7/02*
(2013.01); *A01J 7/04* (2013.01)

(58) Field of Classification Search
CPC .... A01J 5/0175; A01J 7/02; A01J 7/04; A01J
5/007; A01J 5/017
See application file for complete search history.

(56) References Cited

U.S. PATENT DOCUMENTS 6,425,346 B1 *　7/2002　Birk ....................... A01J 5/0175
119/14.08
8,622,026 B1 *　1/2014　Dole ......................... A01J 7/04
119/670
(Continued)

FOREIGN PATENT DOCUMENTS

CA　　　2391159 C　*　1/2009　.............. A01J 5/007
EP　　1 520 468 A1　　4/2005
(Continued)

OTHER PUBLICATIONS

International Search Report, issued in PCT/NL2021/050189, dated
Jun. 16, 2021.
(Continued)

*Primary Examiner* — Joshua D Huson
*Assistant Examiner* — Spencer T Callaway
(74) *Attorney, Agent, or Firm* — Birch, Stewart, Kolasch
& Birch, LLP

(57)　　　　ABSTRACT

A milking device for milking of a dairy animal with teats
includes a control unit, a milking device including milking
cups, a robot arm to attach the milking cups to the teats of
the dairy animal, a teat-detecting device to determine posi-
tions of the teats, including an outer optically permeable
component, such as a lens or cover plate, and a cleaning
device to clean the optically permeable component. The
cleaning device is provided with a cleaning liquid supply
and an application device to apply the cleaning liquid to the
optically permeable component. The milking device
includes a spraying device for spraying a teat-treating liquid
on the teats. The application device is configured to apply
cleaning liquid to the optically permeable component at least
while the spraying device sprays the teat-treating liquid. As
a result thereof, adhesion of the often sticky teat-treating
(Continued)

Figure 1:
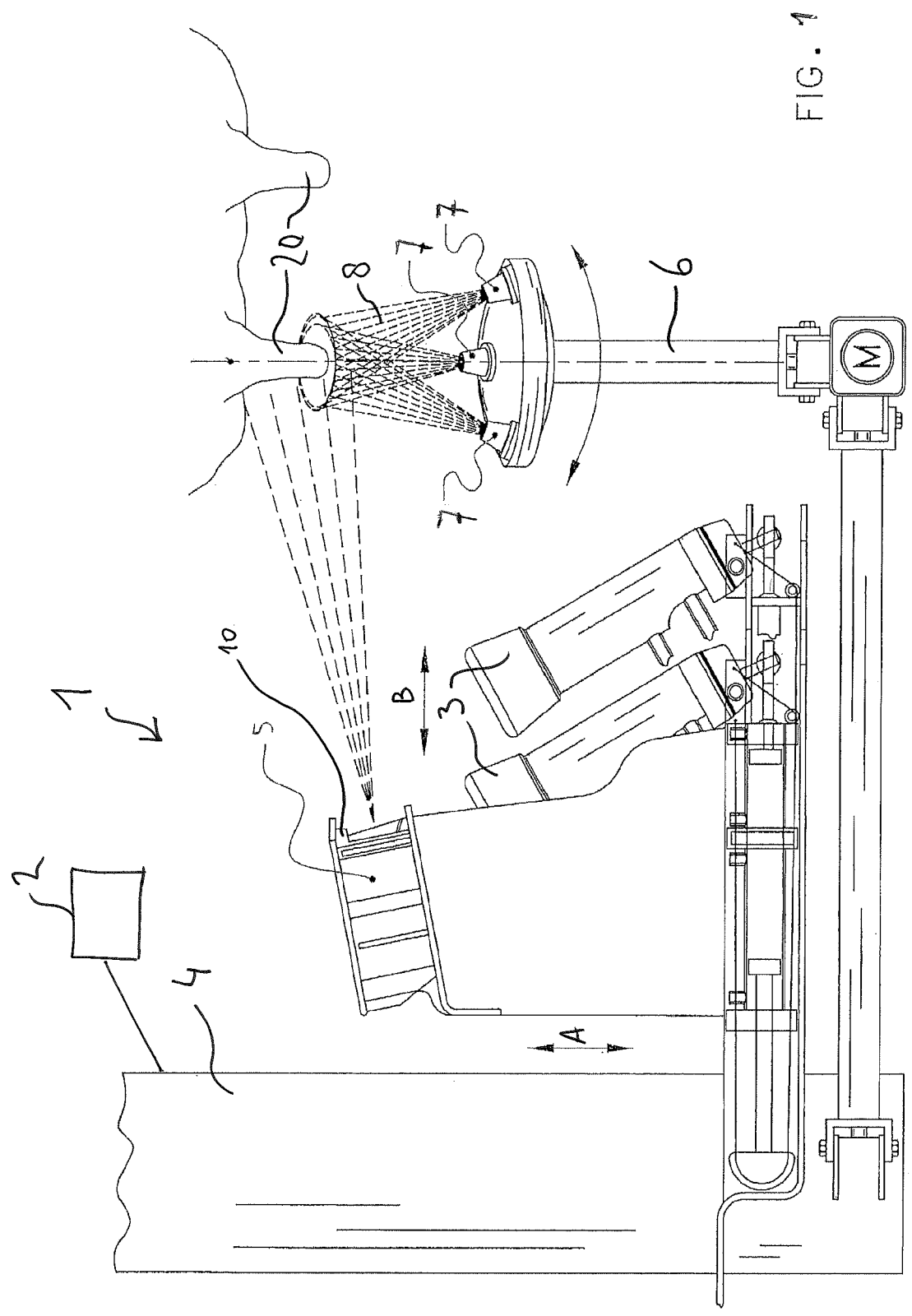

liquid to the optically permeable component is efficiently counteracted.

20 Claims, 2 Drawing Sheets

(56)                    References Cited

U.S. PATENT DOCUMENTS

| | | | | |
|---|---|---|---|---|
| 9,686,958 | B2 * | 6/2017 | Sellner | A01J 5/01 |
| 2012/0272916 | A1 * | 11/2012 | Hofman | A01J 5/007 |
| | | | | 119/14.08 |
| 2018/0255745 | A1 | 9/2018 | Van Den Berg et al. | |

FOREIGN PATENT DOCUMENTS

| | | | | | |
|---|---|---|---|---|---|
| EP | 3 430 889 | A1 | 1/2019 | | |
| SE | 513021 | C2 * | 6/2000 | | A01J 5/007 |
| WO | WO 2012/087233 | A1 | 6/2012 | | |
| WO | WO-2013062466 | A1 * | 5/2013 | | A01K 1/0017 |
| WO | WO 2014/204391 | A1 | 12/2014 | | |
| WO | WO-2015009214 | A1 * | 1/2015 | | A01J 7/02 |

OTHER PUBLICATIONS

Written Opinion of the International Searching Authority, issued in PCT/NL2021/050189, dated Jun. 16, 2021.

* cited by examiner

MILKING DEVICE FOR MILKING A DAIRY ANIMAL

The present invention relates to a milking device for milking a dairy animal with teats, comprising a control unit configured to control the milking device, milking means comprising milking cups configured to milk a dairy animal, a robot arm configured to attach the milking cups to the teats of the dairy animal, a teat-detecting device configured to determine positions of the teats, and comprising an outer optically permeable component, in particular a lens or cover plate, a cleaning device configured to clean said optically permeable component, and provided with a cleaning liquid supply, an application device configured to apply the cleaning liquid from the cleaning liquid supply to said optically permeable component, wherein the milking device furthermore comprises a spraying device configured to spray a teat-treating liquid on the teats.

Such milking devices are known in the prior art. For example, the company Lely supplies the Astronaut® milking robot, which has a robot arm to attach the milking cups. After milking, an after-treatment liquid ("teat dip") is sprayed onto the teats.

In order to do this correctly, the optical teat detector has to monitor the teat positions. However, the known system has a drawback which is that it is difficult to maintain the reliability of the teat detection and teat position determination. Not only does this result in the spraying of the teats with the cleaning agent becoming less reliable, but attaching the milking cups to the teats becomes less reliable as well.

WO2012/087233A1 discloses a milking system in which a window of a teat detection camera is protected from dust and, for example, droplets of a teat-treating liquid by causing a curtain of compressed air to flow across that window during a further operation of the milking device, such as this spraying. However, this milking device nevertheless also has the problem of a decreasing detector reliability.

It is therefore an object of the present invention to improve the known device in such a way that it achieves greater reliability, in particular when attaching and spraying the teats.

The invention achieves this object by a milking device as claimed in claim 1, in particular a milking device for milking a dairy animal with teats, comprising a control unit configured to control the milking device, milking means comprising milking cups configured to milk a dairy animal, a robot arm configured to attach the milking cups to the teats of the dairy animal, a teat-detecting device configured to determine positions of the teats, and comprising an outer optically permeable component, in particular a lens or cover plate, a cleaning device configured to clean said optically permeable component, and provided with a cleaning liquid supply, an application device configured to apply the cleaning liquid from the cleaning liquid supply to said optically permeable component, wherein the milking device furthermore comprises a spraying device configured to spray a teat-treating liquid on the teats, wherein the application device is configured to apply cleaning liquid on said optically permeable component at least while the spraying device is spraying the teat-treating liquid. The cleaning liquid which is thus applied to the component during spraying of the teat-treating liquid ensures that the droplets of this teat-treating liquid cannot adhere to the component, at least much less well. After all, teat-treating liquid is often very sticky in order to be able to adhere to the teat, and would be much more difficult to remove from the component after it has adhered to that component. And adhering droplets are a disadvantage with regard to the quality of the position determination and thus for detecting teat positions. Due to the fact that the improved milking device according to the invention counteracts adhesion of the teat-treating liquid droplets, the optically permeable component of the teat-detecting device remains cleaner, so that the latter is able to determine the teat positions more reliably.

It should be noted here that the compressed air curtain known from WO2012/087233A1 has drawbacks compared to the liquid as used in the present invention. This is due to the fact that droplets are often sufficiently heavy to be insufficiently blocked by the compressed air curtain. Not only are they then still able to soil the optically permeable element, but the fact that the air current causes the droplets to dry more quickly and thus enhances adhesion is worse. Even if the air current is made very powerful, the known device has a drawback, namely the fact that this air current then does not remain limited to the vicinity of the surface of the optically permeable element. The diffused air current may then carry the droplets which it should block further along, and deposit them on other parts of the milking device, which is undesirable. In extreme cases, the excessively strong air current could even disturb the correct application of the teat-treating liquid and would probably also swirl up dust in the vicinity. By contrast, the cleaning liquid of the present invention will carry along any teat-treating liquid droplets and discharge them when the cleaning liquid is finally discharged, so that these droplets cannot end up elsewhere. Also, the correct application of the teat-treating liquid cannot be adversely affected and the influence of the liquid remains local in any case, so that no dust will be swirled up.

Advantageous embodiments are described in the dependent claims and in the following part of the description.

In embodiments, the application device is configured to apply said cleaning liquid to said component before said spraying. As a result thereof, the cleaning liquid can already distribute itself slightly across the component, and it can at any rate be prevented that teat-treating liquid reaches the component before cleaning liquid has been applied on the spot. In particular, the application device is configured to apply said cleaning liquid to said component at least a predetermined time period prior to said spraying. This makes it possible to ensure in a more reliable manner that cleaning liquid is already present on the component before the teat-treating liquid is sprayed. Here, the expression "at least a predetermined time period prior to" is understood to mean that the application of cleaning liquid takes place at least said time period before spraying of teat-treating liquid takes place and/or that the application takes place at least during said time period, before spraying of the teat-treating liquid starts. For example, the application of the cleaning liquid is already started 2 seconds before spraying of teat-treating liquid commences, although other time periods are obviously not ruled out.

In embodiments, the application device is configured to apply cleaning liquid to said component at least for as long as the spraying device sprays teat-treating liquid. This measure ensures that an effective amount of cleaning liquid is always provided on the component which can keep teat-treating liquid droplets off the component. The cleaning liquid then forms a "shield", as it were, against the teat-treating liquid. It should be noted that the optically permeable component is the outer part through which the optical radiation for the teat-detecting device passes. This component is often, in particular, a cover plate, but may also directly be a lens.

In embodiments, the milking device furthermore comprises a blowing device which is configured to blow-dry the optically permeable component after said spraying has finished. This blow-drying serves to remove any remaining cleaning liquid from the optically permeable component, so that the teat-detecting device can work in an optimum manner again, according to the invention without adhering droplets of teat-treating liquid, but also without any droplets of cleaning liquid. In this case, the blowing device may comprise a compressed air device, for example with an outlet opening along an edge or side of the optically permeable element.

In particular, the blowing device is configured to blow air during the spraying of teat-treating liquid. This has the effect that droplets of teat-treating liquid are blocked by means of both the blown air and the cleaning liquid, which makes keeping the outer optically permeable component clean even more reliable.

It should be noted here that the cleaning liquid which is present during, and possibly prior to, the spraying of teat-treating liquid on the optically permeable component may and will obviously disturb the teat-detecting properties of the detecting device. However, the teat-detecting device will detect the teats prior to the spraying of the teat-treating liquid, so that the fact that the teat-detecting device may not work efficiently during spraying is not a problem.

In particular, the application device is configured to perform a cleaning operation after said spraying of teat-treating liquid by the spraying device, comprising applying cleaning liquid in a predetermined amount and/or for a predetermined switch-off delay time. This measure makes it possible, in so far as it is still necessary, to perform a cleaning operation of the component following spraying of teat-treating liquid in order to ensure that droplets of teat-treating liquid which have nevertheless ended up on the component to remove. It will be clear that the cleaning liquid can do this efficiently, partly because the cleaning liquid which has been applied will have caused the possible adhesion of the teat-treating liquid to deteriorate by wetting on the component. Obviously, any blow-dry operation will be performed after the cleaning operation.

Advantageously, the application device is configured to apply cleaning liquid over substantially the entire optically permeable component. This makes the device even less susceptible to adhering droplets of teat-treating liquid. Incidentally, it is possible for the cleaning liquid to be applied indirectly, in which case only a part of the component is directly sprayed with cleaning liquid, and this cleaning liquid subsequently covers the rest of the component and keeps it free from teat-treating liquid. The term "substantially" is in this case understood to mean at least the part of the optically permeable component which is operational for the operation of the teat-detecting device. For example, a corner which would already be omitted in vignetting or which is not considered in optical image processing can in principle be ignored.

In embodiments, the application device comprises a liquid outlet which is configured to apply a film of said cleaning liquid to the component. A film is a very efficient way of preventing adhesion of teat-treating liquid to all (outer) parts of the optically permeable component. For example, the application device comprises a sprayer which sprays the cleaning liquid on the component. After spraying for some time, a sufficiently distributed film will have formed on the component. Alternatively or additionally, the application device comprises an outlet opening situated above said component and as wide as said component. Thus, the cleaning liquid is able to flow across the component, under the effect of an initial velocity and the force of gravity, wherein adhesion may keep the liquid on the component. In this way, a film may be formed in a very reliable manner in a short time, which depends on the distance to be travelled to and across the component and on the velocity of the cleaning liquid. By maintaining the supply of the cleaning liquid, it is readily possible to ensure that the film is present during the entire time teat-treating liquid is being sprayed.

It is furthermore noted here that WO2012/087233A1 also comprises a compressed air device with an outlet opening which generates a "curtain" or film of air across the camera window and a source of cleaning liquid which may be connected to the air outlet opening in order thus to clean the window. However, it is important for this known device to work with air during, for example, the spraying of teat-treating liquid and to apply cleaning liquid only after said spraying. It is thus mainly the time sequence for air and liquid which differs from the present invention.

Figure 2:
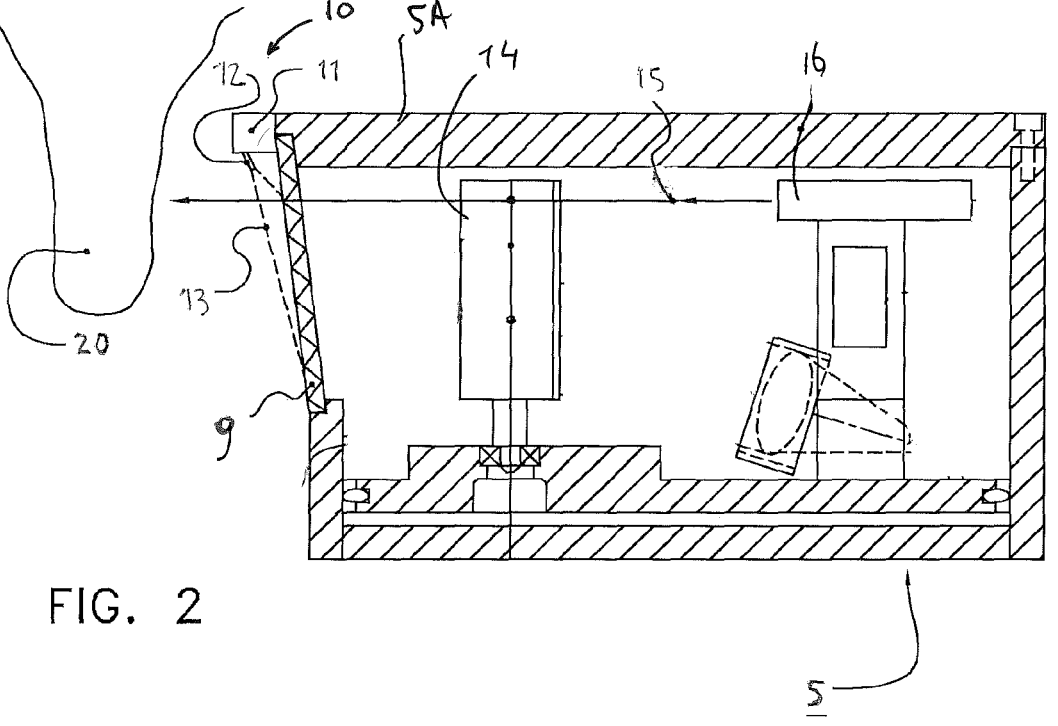

The invention will be explained in more detail below by means of the drawing, in which:

FIG. 1 diagrammatically shows a part of a milking device according to the invention, and FIG. 2 shows a detail of FIG. 1 in a diagrammatical sectional view.

FIG. 1 diagrammatically shows a part of a milking device according to the invention. The milking device is generally denoted by the reference numeral 1 and comprises a control unit 2, milking cups 3, a robot arm 4, a teat-detecting device 5, a teat-treating liquid supply 6 and one or more sprayers 7 which spray liquid in cones 8. A cleaning device is denoted overall by reference numeral 10. Reference numeral 20 denotes teats of a dairy animal.

The milking device 1 has a robot arm 4 which bears milking cups 3 and is able to attach these to teats 20 of a dairy animal. To this end, a teat-detecting device 5 determines the positions of the teats 20. The control unit 2 can then control the robot arm, inter alia in the direction of the arrows A and B, to move the milking cups to the teats. All this is known in the prior art.

After the teats 20 have been milked, the milking cups 3 are removed and the teats 20 are sprayed with a teat-treatment agent, such as a disinfectant. To this end, for example as is the case here on the robot arm 4, but also possibly on a separate device, a spraying device with a liquid supply 6 is supplied and in this case with three spray nozzles 7, although a different number, such as one, is also possible. The spraying device sprays in particular teat-treating liquid, such as a disinfectant dip, in spray cones 8 onto the teats 20. Incidentally, details such as a store and a supply line for the teat-treating liquid, as well as a valve or the like for controlling the supply are not shown here. The control unit of the spraying device forms part of the control unit of the milking device as a whole and may in this case form a separate module or may, for example, comprise internal software.

In order to determine where the teat-treating liquid has to be sprayed, the teat-detecting device 5 determines the position of the teats 20 before spraying and, if necessary, moves the spraying device 6, 7. Droplets which land or could land on the teat-detecting device 5 may be prevented by means of the cleaning device 10. All this will be explained below by means of FIG. 2.

FIG. 2 shows a detail of FIG. 1 in a diagrammatical sectional view. The detail comprises the teat-detecting device 5. Similar components are denoted by the same reference numerals.

The teat-detecting device 5 comprises in a housing 5A which is closed off by an outer optically permeable element 9, here a glass pane. Furthermore, a cleaning device 10 is provided which sprays a cleaning liquid 13 from a cleaning liquid supply 11 via a spray nozzle 12. Reference numeral 14 denotes a rotatable mirror, reference numeral 15 a laser beam from a laser source 16.

The teat-detecting device 5 detects teats 20 by means of optical radiation, such as visible light or infrared light. In FIG. 2, a laser source 16 provides a laser beam 15 which is displayed on a teat 20 via a rotatable mirror 14. Details with regard to such a teat-detecting device may be taken from the teat-detection system of the Lely Astronaut® milking robot, but are are not important here. Thus, it is also possible for a teat-detecting device which is based on a video camera, stereo camera or 3D camera, such as a time-of-flight camera, to be provided instead of the illustrated, laser-based teat-detecting device. In all cases, light is used which will have to penetrate an outer optically permeable element. In the remainder of this application, the laser-based detection direction will be used for the sake of convenience.

In addition to the glass pane 9, the teat-detecting device 5 thus contains additional optical elements contains, such as the mirror 14. But only the outer optically permeable element, in this case glass pane 9, can be soiled by sticky droplets of teat-treating liquid. In order to prevent this, a cleaning device 10 is provided according to the invention, which provides cleaning liquid 13, such as water, on advantageously substantially the entire glass pane 9. To this end, the spray nozzle 12 sprays the water from the supply 11 in the direction of the glass pane 9 from above. In this case, the spray nozzle 12 is for example a spray nozzle with a wide jet or for example an elongate spray nozzle substantially as wide as the glass pane 9, in each case in order thus to cover the glass pane 9 with water, either with a film or with so many droplets that substantially the entire glass pane 9 is covered at one point in time. Other ways to apply the cleaning liquid in a covering manner are also possible.

In this case, the control unit 2 controls the cleaning device 10 to apply the water, or another cleaning liquid, to the optically permeable component 9 when the one or more spray nozzles 7 spray teat-treating liquid. It is possible for the control unit 2 to already start slightly earlier to apply water and it is also possible to allow the control unit 2 to still apply water to the glass pane for some time after spraying of the teat-treating liquid in order to still remove droplets or other soil particles which have nevertheless landed on the glass pane 9.

It should be noted that after the water 13 has been sprayed, the remaining water droplets may be removed by blowing compressed air through, for example, the spray nozzle 12 or, if desired, via another outlet opening. To this end, a compressed air supply (not shown) is provided here. Obviously, the control unit 2 has to cause the compressed air to be blown after the water 13 has been applied. Furthermore, it is possible to achieve an additional droplet-repellent action by means of said compressed air. The compressed air then acts as a kind of curtain against approaching droplets. If there are droplets of teat-treating liquid which still manage to reach the glass pane 9, then the cleaning liquid will catch these and discharge them before they adhere to the glass pane. The compressed air may then be supplied, for example, via a separate spray nozzle, in which case the spray nozzle 12 for the cleaning liquid is situated between this separate spray nozzle and the glass pane 9. The compressed air then blows over the cleaning liquid, at least past it, without impeding it from keeping the glass pane wet.

The invention is not limited to the illustrated exemplary embodiments. By contrast, the scope of protection is determined by the attached claims.

The invention claimed is:

1. A milking device for milking of a dairy animal with teats, comprising:
   a control unit configured to control the milking device,
   milking means comprising milking cups configured to milk a dairy animal,
   a robot arm configured to attach the milking cups to the teats of the dairy animal,
   a teat-detecting device configured to determine positions of the teats, and comprising an outer optically permeable component,
   a cleaning device configured to clean said outer optically permeable component, the cleaning device being provided with:
      a cleaning liquid supply, and
      an application device configured to apply cleaning liquid from the cleaning liquid supply to said outer optically permeable component, and
   a spraying device configured to spray a teat-treating liquid on the teats,
   wherein the application device is configured to apply cleaning liquid on said outer optically permeable component at least while the spraying device is spraying the teat-treating liquid.

2. The milking device as claimed in claim 1, wherein the application device is configured to apply said cleaning liquid to said outer optically permeable component prior to at least a predetermined time period prior to, said spraying.

3. The milking device according to claim 2, wherein the application device is configured to apply cleaning liquid to said outer optically permeable component at least for as long as the spraying device sprays teat-treating liquid.

4. The milking device as claimed in claim 2, furthermore comprising a blowing device configured to blow-dry the outer optically permeable component after said spraying has finished, and to blow air during the spraying of teat-treating liquid.

5. The milking device as claimed in claim 2, wherein the application device is configured to apply cleaning liquid over substantially the entire outer optically permeable component.

6. The milking device according to claim 1, wherein the application device is configured to apply cleaning liquid to said outer optically permeable component at least for as long as the spraying device sprays teat-treating liquid.

7. The milking device as claimed in claim 6, wherein the application device is configured to perform a cleaning operation after said spraying of teat-treating liquid by the spraying device, comprising applying cleaning liquid in a predetermined amount and/or for a predetermined switch-off delay time.

8. The milking device as claimed in claim 7, furthermore comprising a blowing device configured to blow-dry the outer optically permeable component after said spraying has finished, and in particular to blow air during the spraying of teat-treating liquid.

9. The milking device as claimed in claim 7, wherein the application device is configured to apply cleaning liquid over substantially the entire outer optically permeable component.

10. The milking device as claimed in claim 6, furthermore comprising a blowing device configured to blow-dry the outer optically permeable component after said spraying has finished, and to blow air during the spraying of teat-treating liquid.

11. The milking device as claimed in claim 6, wherein the application device is configured to apply cleaning liquid over substantially the entire outer optically permeable component.

12. The milking device as claimed in claim 1, further comprising a blowing device configured to blow-dry the outer optically permeable component after said spraying has finished, and to blow air during the spraying of teat-treating liquid.

13. The milking device as claimed in claim 12, wherein the application device is configured to apply cleaning liquid over substantially the entire outer optically permeable component.

14. The milking device as claimed in claim 1, wherein the application device is configured to apply cleaning liquid over substantially the entire outer optically permeable component.

15. The milking device as claimed in claim 14, wherein the application device comprises a liquid outlet which is configured to apply a film of said cleaning liquid to the component.

16. The milking device as claimed in claim 15, the application device comprising a sprayer or an outlet opening situated above said outer optically permeable component and as wide as said component.

17. The milking device as claimed in claim 14, wherein the application device comprises a sprayer or an outlet opening situated above said component and as wide as said component.

18. The milking device as claimed in claim 1, further comprising a control unit to control the application device to apply the cleaning liquid to the outer optically permeable component when the spraying device sprays the teat-treating liquid.

19. The milking device as claimed in claim 18, further comprising a control unit to control the application device to apply the cleaning liquid to the outer optically permeable component from before when the spraying device sprays the teat-treating liquid until after the spraying device sprays the teat-treating liquid.

20. The milking device as claimed in claim 1, further comprising a control unit to control the application device to apply the cleaning liquid to the outer optically permeable component depending on when the spraying device sprays the teat-treating liquid.

* * * * *